J. LAUGHLIN.
OPERATING TABLE.
APPLICATION FILED JUNE 5, 1908.
926,579.
Patented June 29, 1909.
2 SHEETS—SHEET 1.
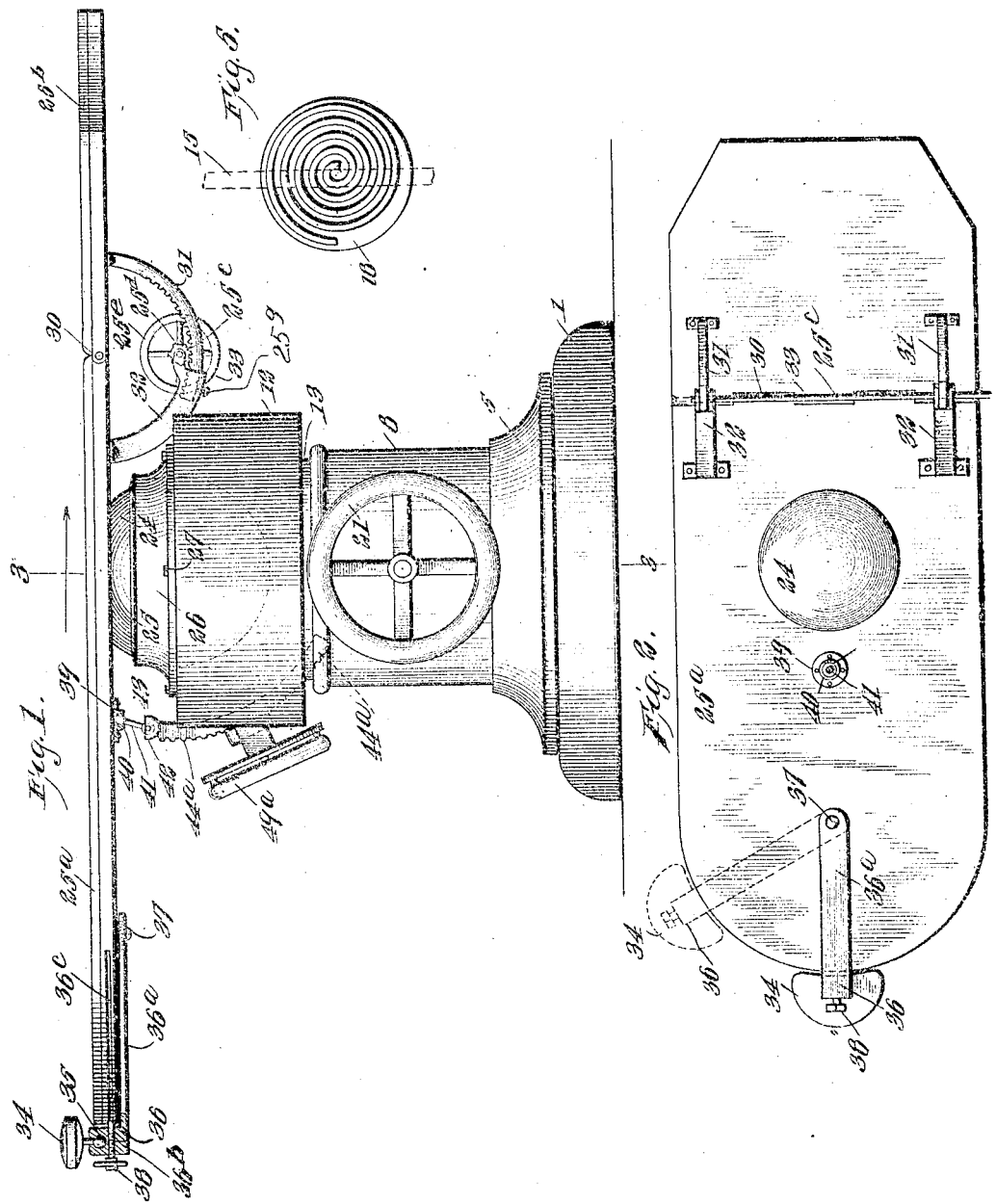
WITNESSES
INVENTOR
JUDSON LAUGHLIN
BY Munn & Co.
ATTORNEYS

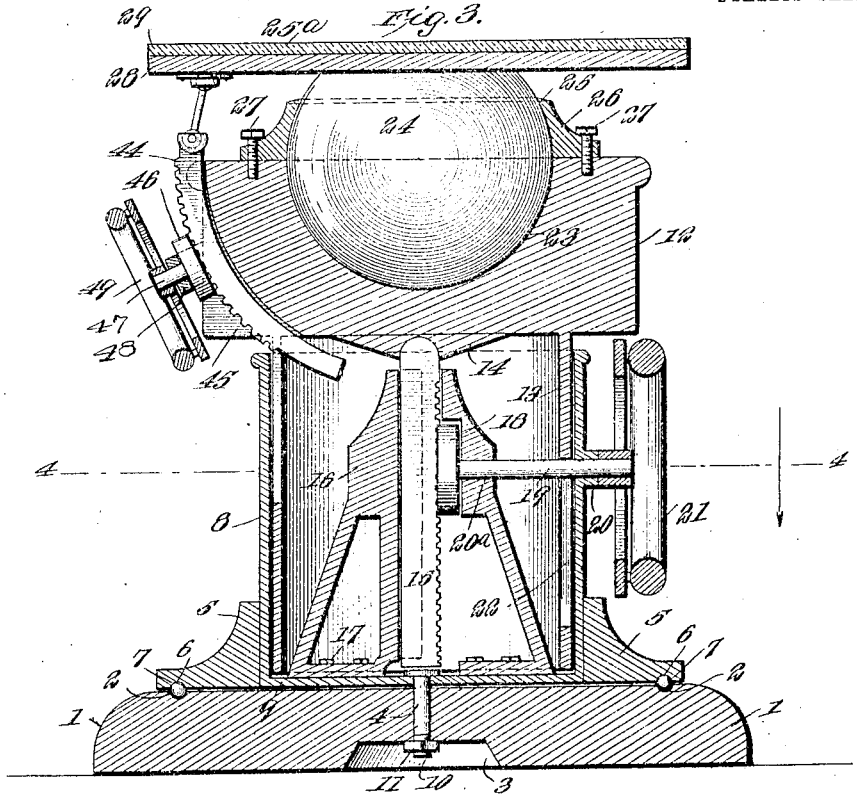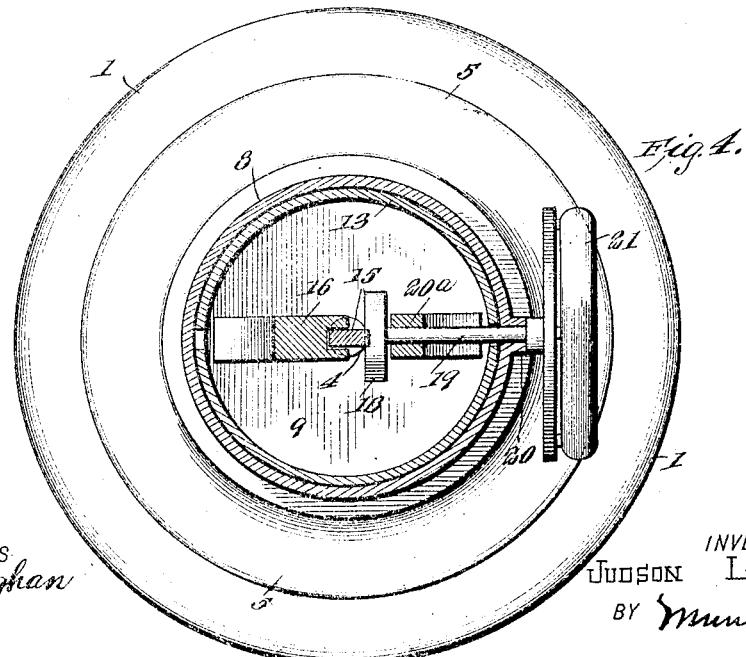

UNITED STATES PATENT OFFICE.

JUDSON LAUGHLIN, OF LEDYARD, IOWA.

OPERATING-TABLE.

No. 926,579.

Specification of Letters Patent.

Patented June 29, 1909.

Application filed June 5, 1908. Serial No. 436,204.

*To all whom it may concern:*

Be it known that I, JUDSON LAUGHLIN, a citizen of the United States, and a resident of Ledyard, in the county of Kossuth and State of Iowa, have invented certain new and useful Improvements in Operating-Tables, of which the following is a specification.

My invention is an improvement in operating tables, and consists in certain novel constructions and combinations of parts hereinafter described and claimed.

Referring to the drawings forming a part hereof Figure 1 is a side view of the improvement. Fig. 2 is a bottom plan view of the table proper. Fig. 3 is a section on the line 3—3 of Fig. 1, and Fig. 4 is a section on the line 4—4 of Fig. 3. Fig. 5 is a detail view of the spiral threaded wheel.

The present embodiment of my invention comprises a base 1, in the present instance circular in form, and having on its upper surface an annular groove 2, and on its lower surface at the center thereof, a recess 3, and a vertical opening 4 at the center of the recess.

A ring 5 is rotatably mounted on the base, the said ring having on its lower face an annular groove 6 registering with the groove 2 before described, the grooves co-acting to form a ball race, in which are arranged a plurality of balls 7.

A cylindrical casing 8 is arranged within the ring the said casing having a closed bottom 9, and an open top, and at the center of the bottom is an opening registering with the opening before mentioned, and a bolt 10 traverses the registering openings, a nut engaging the lower end of the bolt to secure the parts in place. The casing 8 is secured within the ring in any suitable manner, and a block 12 is provided with a depending cylindrical casing 13, movable within the casing 8 before mentioned the casings 8 and 13 forming a telescoping support for the block.

The lower face of the block is provided with a boss 14, having a depression in which is received the upper end of a rack 15, the rack sliding in a guide-way in a bracket 16, bolted to the bottom of the casing 8 by bolts 17.

A wheel 18 is provided with a spiral thread for engaging the teeth of the rack, the said wheel being secured to the inner end of a shaft 19, journaled in a bearing 20 in the side of the casing 8, and a bearing 20ª in the bracket, and provided with a hand wheel 21 for convenience in manipulating the same.

It will be evident from the description that by rotating the hand wheel 21, the block may be raised and lowered with respect to the base, and the casing 13 is provided with a slot 22 in which the shaft 19 moves whereby to permit such movement.

The upper face of the block 12 is provided with a semi-spherical depression 23, in which is received a ball 24, connected with the table proper 25ª, and a ring 26 encircles the depression 23 for securing the ball in place, the ring being secured to the block by set screws 27. The ring is shaped to fit the ball, and it will be evident that the table 25ª may be moved into a variety of positions with regard to the block, the connection being a ball and socket joint.

As shown the table comprises a body 28 of metal or other suitable material, and a face 29 of glass. The table is formed in two sections 25ª, 25ᵇ, connected by a hinge 30 and to one of the sections 25ᵇ are secured arc-shaped rack bars 31, which telescope in arc-shaped guides 32, secured to the section 25ª, and a spindle 25ᶜ is journaled in bearings on the guides 32, the spindle being provided with pinions 25ᵈ meshing with the rack bars and a handle wheel 25ᵉ for manipulating the spindle. The bearings are retained in their adjusted position by a set screw 25ᶠ.

A head rest 34 is provided with a ball 35 engaging a two part socket, one of the parts 36 being integral with a bar 36ª pivoted to the section 25ª at 37, and a set screw 38 traverses the other section 36ᵇ of the socket and engages a groove 36ᶜ on the edge of the table. The head rest may be swung from side to side as shown in dotted lines in Fig. 2, and by loosening the set screw it may be adjusted with respect to the socket.

A socket plate 39 is secured to the section 25ª, in which is arranged a ball 40 on a rod 41, having on its other end a ball 42, received in a socket 43, in an arc-shaped rack bar 44, which bar passes downward through a notch 45 in the block 12, and is engaged by a wheel 46 having on its inner face a spiral thread, the wheel being secured to a stud shaft 47, journaled in a bearing 48 on the block, and the stud shaft is provided on its outer end with a hand wheel 49 for manipulating the same.

The above described mechanism is arranged at the side of the table whereby to permit tilting of the table on its longitudinal axis, and a similar arrangement is shown at the end of the table in Fig. 1, the said arrangement comprising the rack bar 44ª, connected to the table in the same manner as the rack bar 48, and operated by a hand wheel 49ª. By proper manipulation of the hand wheel 49ª, the table may be tilted on a transverse axis.

It will be evident from the description, that the table may be adjusted in a variety of positions being capable of rising and falling movement, rotary movement, tilting on its longitudinal axis, and tilting on its transverse axis, and also an infinite variety of combinations of the two named tilting movements.

It is obvious that the table may be constructed of any suitable material, and may be made in any suitable dimensions.

I claim:

In an operating table, a base, a table having a ball and socket connection with the base, and means for retaining the table in adjusted position, said means comprising rack segments having a universal joint connection with the table, and arranged at right angles to each other, and wheels journaled on the base and provided with a spiral thread on their faces for engaging the racks.

JUDSON LAUGHLIN.

Witnesses:
E. J. SKINNER,
O. L. GRAVES.